United States Patent [19]
Assmus et al.

[11] Patent Number: 5,708,686
[45] Date of Patent: Jan. 13, 1998

[54] METHOD FOR RECEIVER-SIDE CLOCK RECOVERY FOR DIGITAL SIGNALS

[75] Inventors: Ulf Assmus, Darmstadt; Willy Heckwolf, Münster; Detlef Martin, Rossdorf; Dieter Becker, Darmstadt, all of Germany

[73] Assignee: Deutsche Telekom AG, Germany

[21] Appl. No.: 618,437

[22] Filed: Mar. 15, 1996

[30] Foreign Application Priority Data

Mar. 16, 1995 [DE] Germany .................. 195 09 484.0

[51] Int. Cl.$^6$ .................................................. H04L 7/00
[52] U.S. Cl. ............................ 375/372; 365/189.04
[58] Field of Search ............................ 375/372, 359, 375/371; 365/189.04, 233; 370/102, 505

[56] References Cited

U.S. PATENT DOCUMENTS

| | | | |
|---|---|---|---|
| 4,270,183 | 5/1981 | Robinson et al. | 375/371 |
| 4,596,026 | 6/1986 | Cease et al. | 375/372 |
| 4,718,074 | 1/1988 | Mannas et al. | 375/371 |
| 5,259,007 | 11/1993 | Yamamoto | 375/376 |
| 5,289,138 | 2/1994 | Wang | 375/351 |
| 5,396,492 | 3/1995 | Lien | 375/371 |

OTHER PUBLICATIONS

Martin de Prycker et al., "Asycnchronous Transfer Mode, Solution For Broadband ISDN", published by Ellis Horwood, pp. 115–116.

Ulf Abmus et al., "High-Quality Video and Audio Signal Transmission in a Broadband ISDN based on ATD", Reprinted from EBU-Technical No. 247 (Jun. 1991) pp. 1–7.

*Primary Examiner*—Stephen Chin
*Assistant Examiner*—Betsy Lee Deppe
*Attorney, Agent, or Firm*—Kenyon & Kenyon

[57] ABSTRACT

In a method for receiver-side clock recovery for digital signals having a constant bit rate following cell-structured, asynchronous transmission with pauses of different length between individual cells using the loading state of an FIFO memory into which the received digital signals are written, at the start of a transmission the digital signals are initially read with a received clock into the FIFO memory holding multiple cells of the received signals until the FIFO memory is half filled. The digital signals written into the FIFO memory are read out with a readout clock whose frequency is smaller than the frequency of the received clock. During the readout a signal for controlling the frequency of the readout clock is derived from the respective loading state of the FIFO memory.

16 Claims, 3 Drawing Sheets

METHOD FOR RECEIVER-SIDE CLOCK RECOVERY FOR DIGITAL SIGNALS

FIELD OF INVENTION

The invention concerns a method for receiver-side clock recovery for digital signals having a constant bit rate following cell-structured, asynchronous transmission with pauses of different length between individual cells using the loading state of an FIFO memory into which the received digital signals are written.

BACKGROUND OF THE INVENTION

The transmission of digital signals frequently takes place in an asynchronous and cell-structured manner, it being necessary to shape the digital signals on the receiver side into a continuous digital signal having a constant bit rate. Recovery of the clock underlying the digital signals—also known as the data clock hereafter—is necessary for this purpose.

A method for cell-structured asynchronous transmission of digital signals is described, for example, in Martin Prycker et al.: "ASYNCHRONOUS TRANSFER MODE, Solution for Broadband ISDN", published by Ellis Horwood, pp. 97–116; the acronym ATM has been introduced to designate this method. The preferred application of the method is in the transmission of broadband signals.

In this known method, the recovery of a continuous data stream is possible through buffer storage of the data in an FIFO memory and subsequent clock derivation from the loading state of this FIFO memory. One problem which has not been satisfactorily solved hitherto involves jitter-free clock recovery, which poses difficulties due to the cell structure of the signal with pauses of different length between the individual cells.

SUMMARY OF THE INVENTION

The object of the invention is to specify a method for recovering a continuous clock which is largely free of jitter.

This objective is solved according to the invention in that at the start of a transmission the digital signals are initially read with a received clock into the FIFO memory holding multiple cells of the received signals until the FIFO memory is half-filled, that the digital signals written into the FIFO memory are read out with a readout clock whose frequency is smaller than the frequency of the received clock, and that during the readout a signal for controlling the frequency of the readout clock is derived from the respective loading state of the FIFO memory.

The method according to the invention has the advantage that on the receiver side in the terminal adapter only a larger FIFO memory is necessary to buffer the data. Moreover, it is also possible to arrange this FIFO memory before a cell discriminator so that the cell discriminator must be operated with the lower data clock frequency and not with the significantly higher network clock frequency.

The method according to the invention can be used in an advantageous manner in the transmission of digital signals, for example, in the transmission of encoded audio and video signals, and also of MPEG-encoded signals. The known MPEG methods allow the selection of different transmission bit rates depending on the desired quality of the decoded analog signal. The utilization of these features of the coder and decoder make clock recovery necessary which allows recovery on the receiver side of the clock of the MPEG signal which clock is constant in itself. Although the coder and decoder can be set to different bit rates, the bit rate remains constant during operation.

Although digital methods can also be used to generate a controllable clock frequency, it turns out to be convenient in the method according to the invention if the loading state of the FIFO memory is used to generate a control variable for a voltage-controlled oscillator from whose output signal the readout clock is derived.

Here, it can be provided that the control variable is fed to multiple voltage-controlled oscillators. This makes it possible to cover a large frequency range.

An advantageous specific embodiment of the method according to the invention consists in that the loading state of the FIFO memory is queried at larger time intervals. A coarse smoothing out of the data clock is already possible in this manner. It is advantageously provided in the method according to the invention that a cell clock obtained from the received digital signals is used for stipulating the point in time of queries of the loading state of the FIFO memory.

A further smoothing out of the data clock is possible in that an average value is formed over multiple queries of the loading state of the FIFO memory.

A simple possibility for selecting the data clock consists in an advantageous arrangement for carrying out the method according to the invention in that a controllable frequency divider is connected after the voltage-controlled oscillator to obtain the data clock with selectable frequency. Here, the frequency divider can be controlled with manual entries and/or an internal clock derived from the signal of the voltage-controlled oscillator. An automatic setting is possible, for example, in that the frequency divider is controllable depending on control data received with the digital signals or depending on the loading state.

Another arrangement for carrying out the method according to the invention comprises an arrangement where the FIFO memory is arranged before a cell discriminator. This has the advantage that circuits following the FIFO memory, particularly the cell discriminator, a bit de-interleaver and a parity decoder, can be operated with a lower frequency. A terminal adapter having such circuits, which is suited to the application of the method according to the invention and the arrangement according to the invention, is described by Ulf Aßmus and Serafin Nunes in "Übermittlung yon codierten Audiosignalen niedriger Bitrate in einem zukünftigen ATM-Netz" [Transmission of encoded audio signals with a low bit rate in a future ATM network], RTM Issue 3, 1994, pp. 85–91.

BRIEF DESCRIPTION OF THE DRAWINGS

Exemplary embodiments of the invention are shown in the drawing based on multiple figures and are explained in greater detail in the following description. The following are shown.

Identical parts are provided with identical reference numbers in the figures. The exemplary embodiment as well as parts thereof have been represented as block diagrams. However, this does not mean that the method according to the invention is restricted to an implementation with the aid of individual circuits corresponding to the blocks. Instead, the circuit arrangement according to the invention can be implemented in a particularly advantageous manner with the aid of highly integrated circuits. Here, digital signal processors can be used which, when suitably programmed, carry out the processing steps represented in the block diagrams.

DETAILED DESCRIPTION

Figure 1:
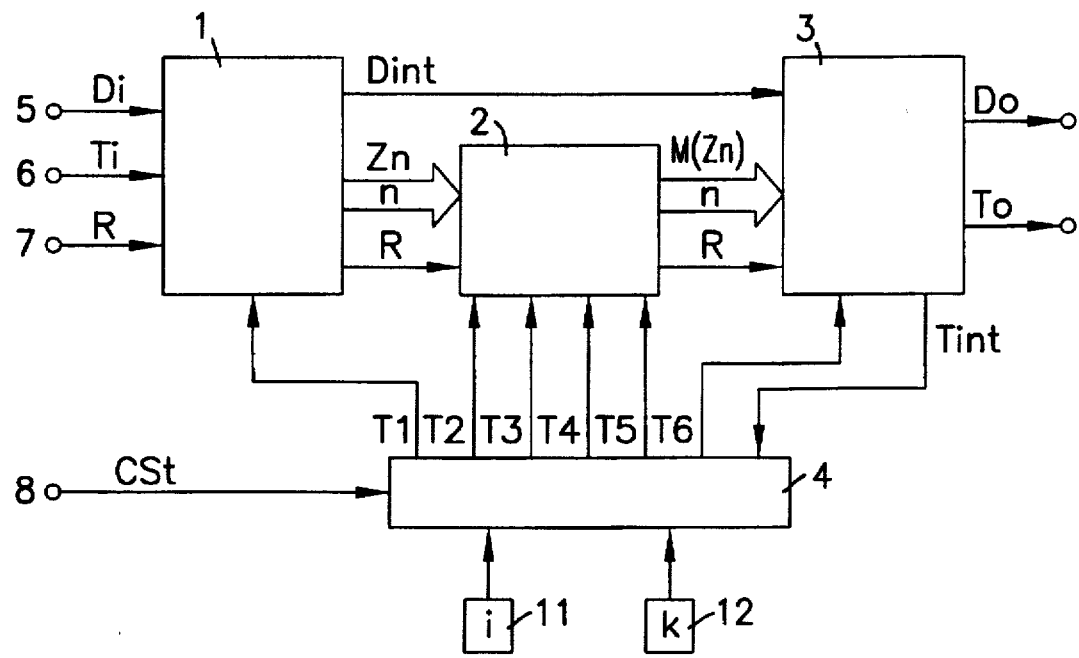
FIG. 1 an arrangement for carrying out the method according to the invention.

The arrangement according to FIG. 1 consists of a memory 1, a signal averager 2, a clock generator 3 and a central clock 4. A clock signal Ti, whose maximum frequency is the frequency of the network clock, a reset signal R and a signal CSt, which marks the start of a cell of the supplied digital signals and is thus called the cell start signal hereafter, are fed to the inputs 5, 6, 7, 8 along with the received data Di.

The following can be obtained from the memory 1: the supplied digital signals as internal data stream Dint, the respective loading state of the FIFO memory contained in the memory 1 as an n-bit-wide signal Zn, and a reset signal R. The memory 1 is described later in greater detail in conjunction with FIG. 2.

From multiple values of the loading state Zn, the average value M(Zn) is formed in the signal averager 2 and fed along with a reset signal R to the clock generator 3, at whose output the data Do are present along with the constant and continuous data clock To.

Figure 3:
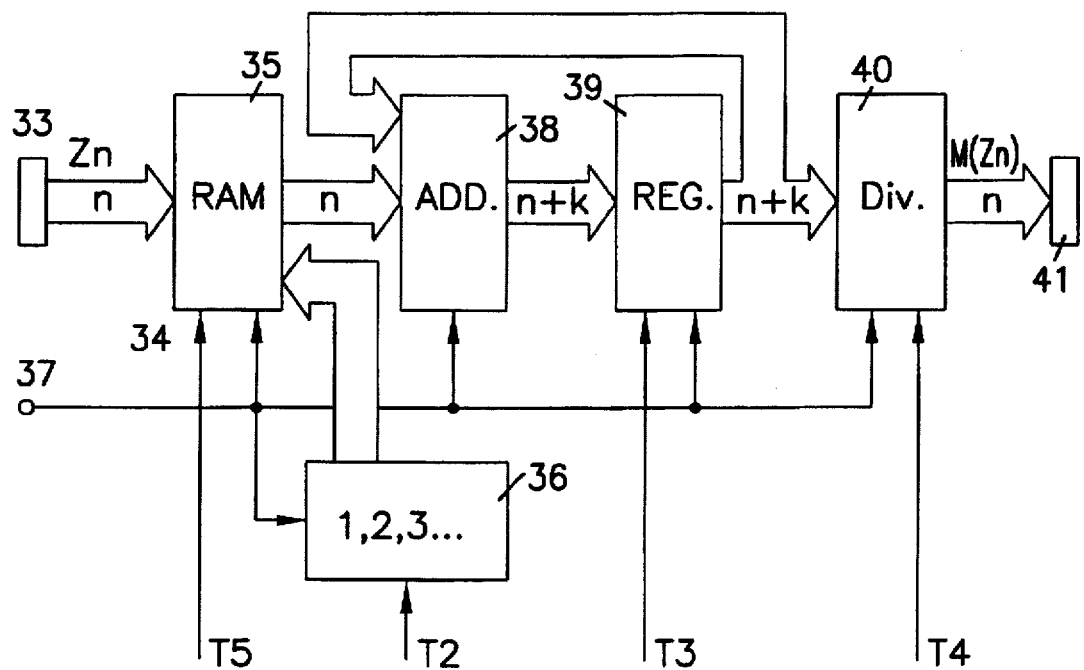
FIG. 3 an arrangement for forming the average value.
Figure 2:
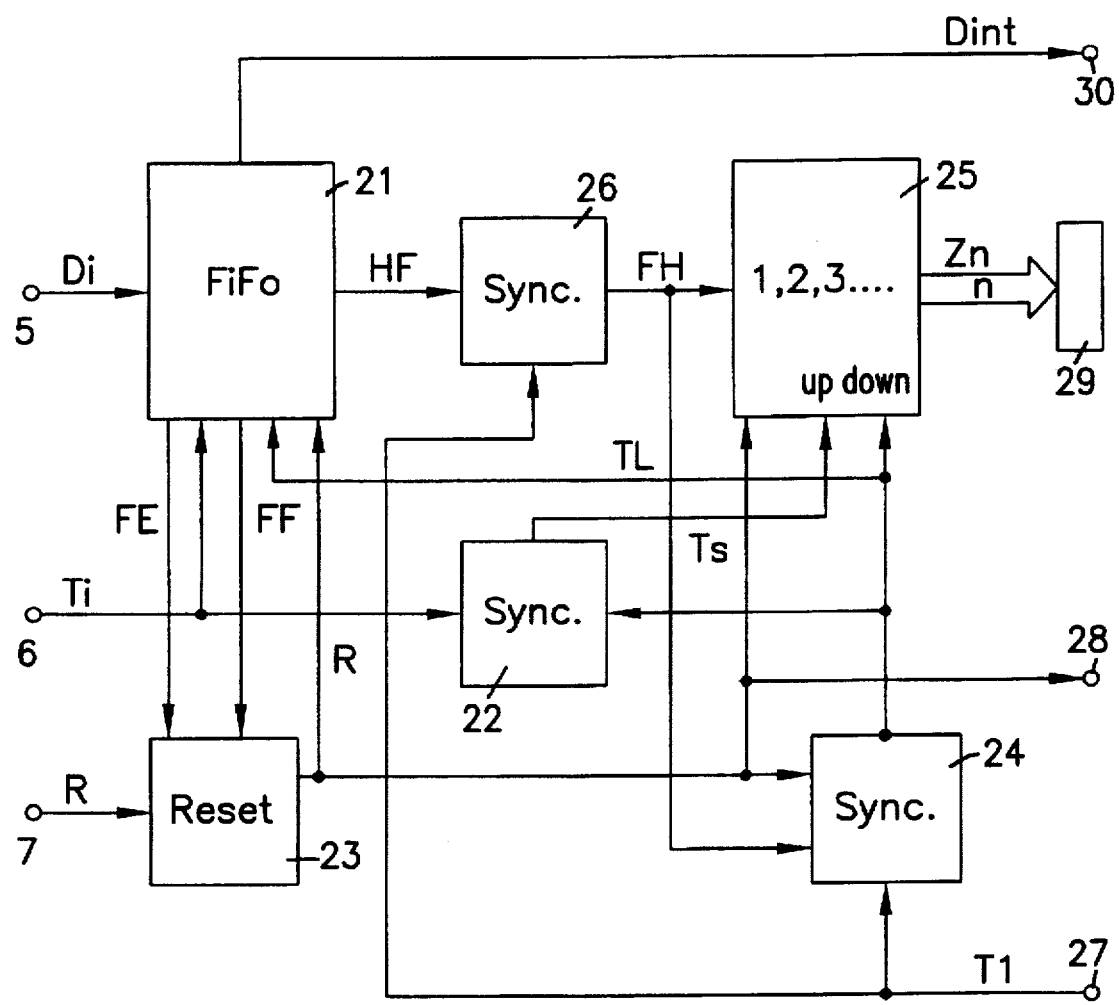
FIG. 2 an arrangement for determining the loading state of the FIFO memory.
Figure 4:
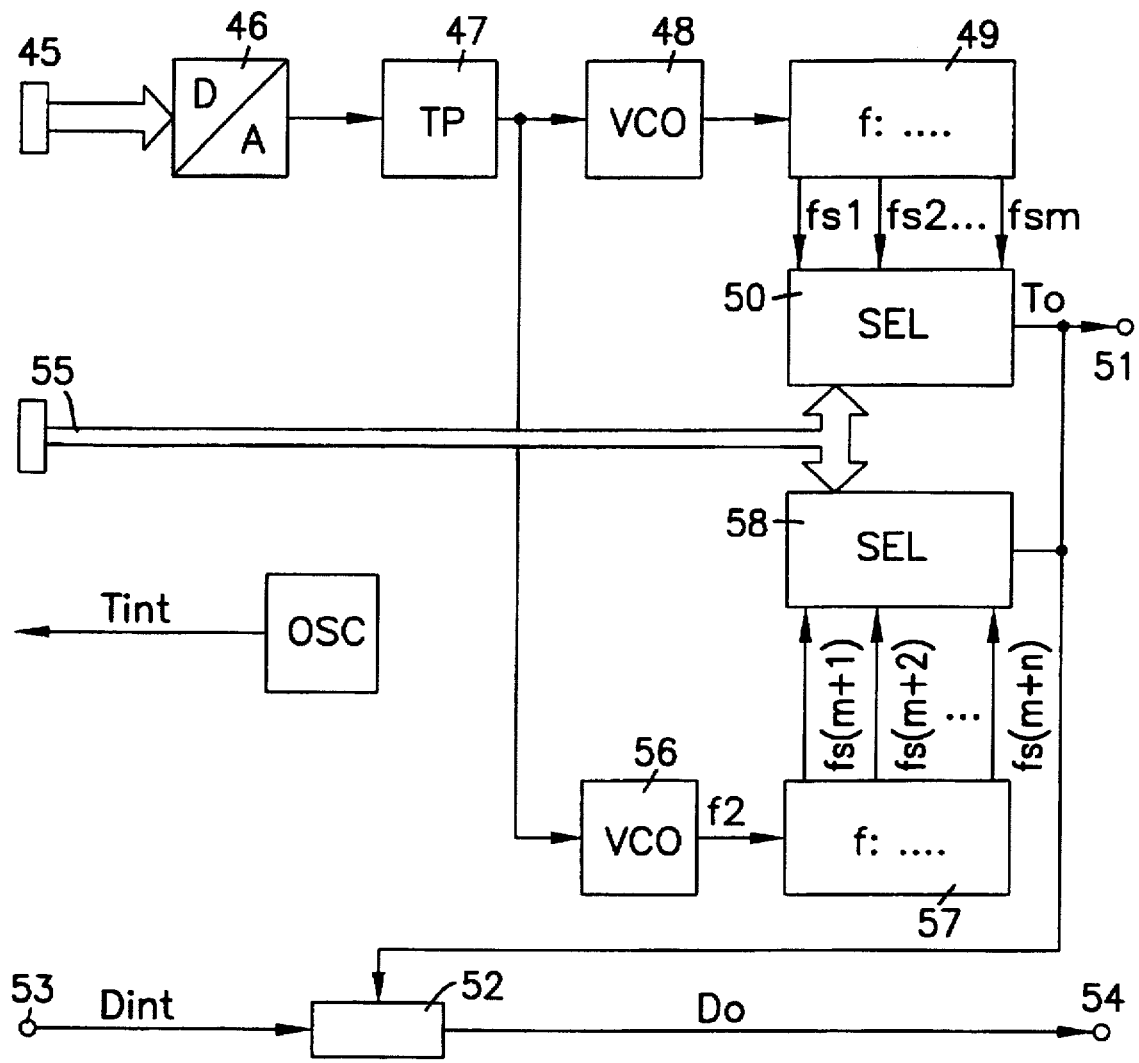
FIG. 4 an arrangement for generating the data clock.

From the clock generator 3, an internal clock Tint is fed to the central clock 4, which derives from this and from the cell start signal CSt clock signals TI to T6, which are needed to control the individual modules within the arrangement according to FIG. 1 and which are explained in greater detail in conjunction with FIGS. 2 to 4. The central clock 4 has two input devices 11, 12 with which quantities i and k can be input manually. The letter i signifies the spacing between two values of the loading state Zn accepted for signal averaging, derived from the cell clock. For this purpose, the cell start signal CSt is counted in the central clock 4 until the set value of i is reached, whereupon a clock signal T5 is generated. For signal averaging, k values are used, it being possible to set k with the help of the input device 12.

FIG. 2 shows a detailed representation of the memory 1 (FIG. 1). The received data signals are fed from the input 5 to the data input of an FIFO memory 21, into which the digital signals Di are written with the clock Ti supplied at 6. The clock Ti is also supplied to a synchronization circuit 22, which is described individually at a later point. The reset signal R is received from the input 7 by a reset circuit 23, which also receives the signals FE and FF from the FIFO memory 21 if the FIFO memory is empty or rather full. Moreover, the reset circuit 23 forwards the signal R to the FIFO memory 21 and to a further synchronization circuit 24.

A counter 25 is connected via a third synchronization circuit 26 to an output of the FIFO memory 21, which delivers a signal HF (half full). The content of the counter, which is designed as an upwards/downwards counter, reproduces the loading state of the FIFO memory 21 and thus represents a pointer to the loading state. To control the counter corresponding to the changes of the loading state of the FIFO memory 21 caused by write and read operations, the counter 25 receives, besides a reset pulse R, the clock signals TL and Ts, which decrement the loading state for a read operation and increment the loading state for a write operation.

The clock signal T1 is fed to the circuit shown in FIG. 2 by the central clock 4 via an input 27. The reset signal R can be extracted for further circuits via an output 28. A third output 29 carries the loading state Zn, while the data Dint are forwarded to the clock generator 3 via an output 30.

Since the clocks T1 and Ti are not synchronized to one another, signals which are initially in the time reference of the clock Ti are brought by the synchronization circuits 22, 24, 26 into the time reference of the clock T1. Thus, for instance, the signal HF, which marks the half full state, is in the reference of clock Ti. However, the counter 25 is operated in the reference of the clock T1. Therefore, a pulse FH* is derived in the synchronization circuit 26 which conforms in time with the first pulse of the clock signal T1 which occurs following a pulse HF. For this purpose, it is simple to trigger a D flip-flop with the clock T1 whose data input has the pulse HF applied to it.

The synchronization circuit 24 does not enable the clock signal TL after power-on or a reset until the pulse FH* indicates the attainment of the half full state. Then, with the help of the clock TL, the readout of the data from the FIFO memory 21 begins as well as a corresponding decrementation of the counter state. The incrementation takes place through, in each case, one pulse of the clock Ts, which is derived with the help of the synchronization circuit 22 from the clock Ti and is conveyed into the reference of the clock T1 via the clock TL. This takes place such that it is ensured that the counter does not simultaneously receive pulses for incrementation and decrementation.

In order to prevent the actual loading state in the FIFO memory 21 and that indicated by the counter 25 from drifting away from one another, the counter 25 is set to the half counter state each time that the FIFO memory 21 gives off a pulse HF. For the case in which—due to a malfunction—the FIFO memory becomes either full or empty, a resetting is brought about via the pulses FF or rather FE, the original state at power-on being reinstated in this manner. The number of bits which can be tapped off of output 29 depends on the size of the FIFO memory, which is given as $2^n$ bits.

Through integration of this block, the pointer can be derived from the counter states of the counters needed for the FIFO memory for readin and readout.

The signal averager 2 (FIG. 1) is shown in greater detail in FIG. 3. The loading state Zn of the memory 1 (FIG. 1) is fed to an input 33. For each single pulse of the clock signal T5 supplied at 34, a value of Zn as an n-bit-wide word is accepted into a read-write memory 35. In the read-write memory 35, as many values of Zn can be stored as are required in each individual case for the subsequent value averaging. The number k to be selected in each case and set at 12 (FIG. 1) is fed to the read-write memory 35 from a counter 36, which counts upwards starting with a reset pulse R supplied at 37 until the clock signal T2 is received and reaches the number k in this manner.

The actual value averaging takes place with the help of an adder 38, a register 39 and a divider 40. At the start of the determination of the average values of, in each case, k values of Zn, the adder 38, the register 39 and the divider 40 are reset, although the read-write memory 35 is not. Each of the then incoming data words is added in the adder 38 to the sum of the values of the preceding (k−1) data words, the oldest value always being replaced by the current latest value of k values. The sum of the values 1 to k is then written into the register 39 and is available for addition with the following data word. The sum added up for k data words is then divided by k in the divider, at whose output 41 the average value M(Zn) out of k words is available.

The register 39 is driven by a clock T3 and the divider by a clock T4. The clock signals T2 to T4 are supplied by the central clock 4 (FIG. 1). The k-times addition results in a data stream which is n+k bits wide. If k is chosen as a multiple of two, the division in the divider 40 can take place in a simple manner through shifting in a shift register as modulo-2 division.

Average values M(Zn) are fed to the clock generator 3 (FIG. 1) shown in FIG. 4 at 45. These average values are converted in a digital/analog converter 46 into an analog signal and subsequently low-pass filtered at 47. The output signal of the low-pass filter 47 represents a control variable for a controllable oscillator 48, which generates a frequency f1 which is dependent on the loading state of the FIFO memory 21 (FIG. 2). The signal having the frequency f1 is fed to a frequency divider 49 which has multiple taps having frequencies fs1, fs2 to fsm. From these signals, the data clock To is derived with the help of a data selector 50. This clock is available on the one hand at an output 51; on the other hand, it controls a buffer memory 52 to which the data Dint are fed via an input 53 from the memory 1 (FIG. 1). At the output 54 of the buffer memory 52, the data Do are available in the time of clock To. A control input of the data selector 50 is connected via a control bus 55 for the clock frequency, via which the frequency of the clock To can be selected.

In the exemplary embodiment of the clock generator according to FIG. 4, a further controllable oscillator 56 is provided whose frequency f2 is divided in a further frequency divider 57, individual frequencies generated by the further frequency divider 57 being fed to a further data selector 58, which can be selected alternatively to the data selector 50 via a control bus 55. Through a suitable choice of the frequencies f1 and f2, it is thus possible to cover a wide range of clock frequencies with a clock generator.

Figure 5:
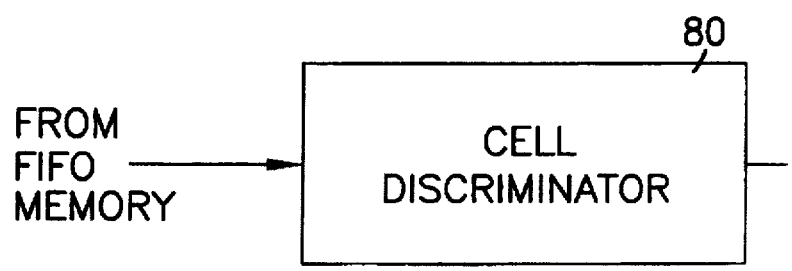
FIG. 5 shows a cell discriminator.

If the clock Tint for the central clock 4 is derived from the frequency of the controllable oscillator, the buffer memory 52 can be designed very small since the data throughput through the previously described circuits can then be readjusted depending on the quantity of data Di at the input 5 (FIG. 1). As shown in FIG. 5, a cell discriminator 80 may also be located after the FIFO memory 21 (FIG. 2).

What is claimed is:

1. A method for receiver-side clock recovery for digital signals having a constant bit rate following cell-structured, asynchronous transmission, the method comprising the steps of:
   initially reading digital signals into a FIFO memory with a received clock until the FIFO memory is half-filled;
   generating a half-full signal whenever the FIFO memory is a half-full state;
   reading out the digital signals stored in the FIFO memory with a readout clock whose frequency is lower than the frequency of the received clock;
   generating during readout a signal for controlling the frequency of the readout clock, the readout clock frequency derived from a loading state of the FIFO memory; and
   setting a counter corresponding to the loading state of the FIFO memory to a half counter state in response to the half-full signal.

2. The method as recited in claim 1 further comprising the step of generating a control variable based on the loading state of the FIFO memory.

3. The method as recited in claim 2 wherein the control variable controls at least one voltage-controlled oscillator from whose output signal the readout clock frequency is derived.

4. The method as recited in claim 3 wherein the control variable is fed to multiple voltage-controlled oscillators.

5. The method as recited in claim 1 further comprising the step of querying the loading state of the FIFO memory at time intervals sufficiently large to provide a smoothing of the readout clock.

6. The method as recited in claim 5 further comprising the step of determining a point in time for querying the loading state of the FIFO memory through a cell clock obtained from the received digital signals.

7. The method as recited in claim 5 further comprising the step of forming an average value of multiple queries of the loading state of the FIFO memory.

8. A method for receiver-side clock recovery for digital signals having a constant bit rate following cell-structured, asynchronous transmission, the method comprising the steps of:
   initially reading digital signals into a FIFO memory with a received clock until the memory is filled to a predetermined level;
   reading out the digital signals stored in the FIFO memory with a readout clock whose frequency is lower than the frequency of the received clock;
   generating during readout a signal for controlling the frequency of the readout clock, the readout clock frequency derived from a loading state of the FIFO memory; and
   forming an average value of the loading state of the FIFO memory through a number of queries of the loading state of the FIFO memory.

9. A digital signal transmission system comprising:
   a memory for reading a received clock and digital signals having a constant bit rate following cell-structured, asynchronous transmission;
   a signal averager receiving an input from the memory, the signal averager for averaging multiple values of a loading state of the memory;
   a clock generator receiving an input from the signal averager, the clock generator receiving an input from the signal averager; and
   a central clock providing timing signals to the memory, signal averager, and clock generator
   the memory being a FIFO memory.

10. The digital signal transmission system as recited in claim 9 wherein the clock generator generates an output clock signal and comprises a buffer memory, the buffer memory receiving data from the memory and the output clock signal.

11. The digital signal transmission system as recited in claim 9 wherein the signal averager has an adder and a divider.

12. The digital signal transmission system as recited in claim 9 wherein the clock generator comprises a controllable frequency divider, the frequency divider being connected after a voltage-controlled oscillator to permit a selectable frequency of an output of the clock generator.

13. The digital signal transmission system as recited in claim 12 wherein the frequency divider is controllable depending on control data received with the digital signals.

14. The digital signal transmission system as recited in claim 12 wherein an internal clock is a function of the signal of the voltage-controlled oscillator.

15. The digital signal transmission system as recited in claim 12 wherein the frequency divider is controllable depending on a loading state of the memory.

16. The digital signal transmission system as recited in claim 9 further comprising a cell discriminator, the memory being arranged at an input of the cell discriminator.

* * * * *